United States Patent
Kam et al.

(10) Patent No.: US 9,653,929 B2
(45) Date of Patent: May 16, 2017

(54) BATTERY CHARGING APPARATUS AND CHARGING METHOD THEREOF

(71) Applicant: Samsung SDI Co., Ltd., Yongin-si, Gyeonggi-do (KR)

(72) Inventors: Jae-Woo Kam, Yongin-si (KR); Hiroaki Takechi, Yongin-si (KR); Won-Chull Han, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 249 days.

(21) Appl. No.: 14/252,307

(22) Filed: Apr. 14, 2014

(65) Prior Publication Data

US 2015/0130418 A1 May 14, 2015

(30) Foreign Application Priority Data

Nov. 11, 2013 (KR) ........................ 10-2013-0136510

(51) Int. Cl.
*H02J 7/00* (2006.01)
(52) U.S. Cl.
CPC .................................. *H02J 7/0008* (2013.01)
(58) Field of Classification Search
USPC ........................................................ 320/112
See application file for complete search history.

(56) References Cited

U.S. PATENT DOCUMENTS

| 2006/0033473 | A1* | 2/2006 | Stanzel | H02J 7/022 320/128 |
| 2008/0174269 | A1* | 7/2008 | DeRome | H02J 7/0045 320/110 |
| 2008/0315832 | A1* | 12/2008 | Kondo | H02J 7/0045 320/110 |
| 2013/0234655 | A1* | 9/2013 | Miwa | H02J 7/0004 320/107 |

FOREIGN PATENT DOCUMENTS

| KR | 10-2013-0049460 A | 5/2013 |
| KR | 10-2013-0061438 A | 6/2013 |

* cited by examiner

*Primary Examiner* — Bryce Aisaka
(74) *Attorney, Agent, or Firm* — Knobbe, Martens, Olson & Bear, LLP

(57) ABSTRACT

A battery charging apparatus and charging method thereof are disclosed. In one aspect, the apparatus includes a battery including a battery pack including at least one battery cell, a battery management system (BMS) configured to control the generation of a terminal voltage based on a type of the battery pack, and a terminal unit including electrodes configured to receive the terminal voltage. The apparatus further includes a charger including a controller configured to determine the type of the battery pack based on the terminal voltage and control the generation of a charging voltage corresponding to the type of the battery pack.

20 Claims, 3 Drawing Sheets

BATTERY CHARGING APPARATUS AND CHARGING METHOD THEREOF

CROSS-REFERENCE TO RELATED APPLICATIONS

This application claims priority to and the benefit of Korean Patent Application No. 10-2013-0136510 filed in the Korean Intellectual Property Office on Nov. 11, 2013, the entire contents of which are incorporated herein by reference.

BACKGROUND

Field

The described technology generally relates to a battery charging apparatus and a charging method thereof.

Description of the Related Technology

The ideal charging voltage and current for charging a battery pack depends on the type of battery cell included in the battery pack.

Generally, each charger is tailored to a specific battery pack depending on the battery cell type. Alternately, a method for selecting the charging voltage or current including communication between the battery pack and the charger has been employed. These specifically tailored chargers may cause ignition and fire when misused.

Moreover, implementing the standard method for selecting the charging voltage or current results in additional costs since additional circuitry and components must be provided to enable communication between the battery pack and the charger.

The above information disclosed in this Background section is only intended to facilitate the understanding of the background of the described technology and therefore it may contain information that does not constitute the prior art that is already known in this country to a person of ordinary skill in the art.

SUMMARY OF CERTAIN INVENTIVE ASPECTS

One inventive aspect is a battery charging apparatus and a charging method thereof capable of determining a cell type and then charging based on the determined cell type.

Another aspect is a battery charging apparatus and a battery charging method capable of distinguishing a cell type and then charging the battery according to the distinguished cell type without an additional communicating device.

Another aspect is a battery charging apparatus including a battery including a battery pack including at least one battery cell, a BMS generating a terminal voltage according to a type of the battery pack, and a terminal unit including electrodes supplied with the terminal voltage, and a charger including a control unit for determining the type of battery by the terminal voltage and controlling to generate a charging voltage corresponding to the type of battery.

The electrodes of the battery charging apparatus are supplied with the charging voltage of the battery pack.

The BMS of the battery charging apparatus determines whether the battery is connected to the charger by the voltage of the electrode, the type of battery by the voltage of the battery pack, and whether the battery is connected to the charger by the charging voltage.

The BMS of the battery charging apparatus determines the type of the battery by the voltage or current of the battery pack.

The battery pack of the battery charging apparatus includes at least one cell and the BMS distinguishes the type of the battery pack by measuring the voltage of the at least one cell.

The BMS of the battery charging apparatus determines an abnormality of the battery pack by using the voltage of the at least one cell.

The battery pack of the battery charging apparatus includes at least one cell and the BMS determines the type of the battery pack by measuring the current of the at least one cell.

The BMS of the battery charging apparatus determines the abnormality of the battery pack by measuring the current of the at least one cell.

The battery of the battery charging apparatus includes a power supply unit for generating the terminal voltage according to control of an MCU and an operating voltage for the MCU and the BMS includes the MCU for determining whether the battery is connected to the terminal unit by measuring the voltage or current of the charge transferred to the terminal unit, distinguishing the type of the battery by using the voltage or current of the battery pack, and controlling the power supply unit to generate the terminal voltage in the power supply unit.

The power supply unit of the battery charging apparatus generates the terminal voltage and supplies the operating voltage for the MCU by the voltage of the battery pack.

The control unit of the battery charging apparatus controls an alternator or generator to generate the charging voltage corresponding to the type of the battery.

The battery of the battery charging apparatus further includes a battery pin and the charger is supplied with the terminal voltage through the battery pin.

A battery charging method for a battery charging apparatus including a battery including a battery pack including at least one battery cell, a BMS generating a terminal voltage according to a type of the battery pack, and a terminal unit supplied with a terminal voltage, the method includes distinguishing the type of battery pack by using the terminal voltage and generating the terminal voltage according to the type of battery pack.

The battery charging method for the battery charging apparatus further includes determining, by a charger, whether the battery pack is connected to the charger by measuring a voltage or current of the terminal unit connected to the battery pack.

The battery charging method for the battery charging apparatus further includes charging the battery pack by the charger by generating the charging voltage of the battery pack corresponding to the terminal voltage.

The battery charging method for the battery charging apparatus in which the battery pack includes at least one battery cell distinguishes the type of battery by voltage of the at least one battery cell.

The battery charging method for the battery charging apparatus further includes determining an abnormality of the battery pack by using the voltage of the at least one cell.

The battery charging method for the battery charging apparatus in which the battery pack includes at least one battery cell includes distinguishing the type of the battery pack by the current of the at least one cell.

The battery charging method for the battery charging apparatus further includes determining the abnormality of the battery pack by using the current of the at least one cell.

According to at least one embodiment, the battery and the charging method thereof are capable of charging different types of battery packs by distinguishing the battery cell types included in the battery packs while maintaining a low manufacturing cost.

In addition, safety is improved by determining whether an abnormality has occurred in the battery pack based on the voltage of the battery pack.

DETAILED DESCRIPTION OF CERTAIN INVENTIVE EMBODIMENTS

Figure 1:
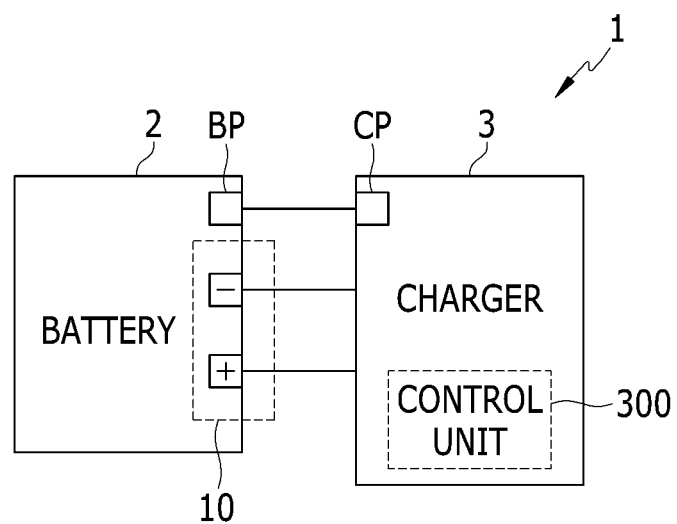
FIG. 1 is a drawing showing a configuration of a charger connected to a battery according to an exemplary embodiment.

The described technology will be described more fully hereinafter with reference to the accompanying drawings, in which exemplary embodiments are shown.

As those skilled in the art would realize, the described embodiments may be modified in various different ways, all without departing from the spirit or scope of the described technology.

In addition, the drawings and description are to be regarded as illustrative in nature and not restrictive Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

In addition, the terms or suffixes "-er", "-or", and "module" as used in the specification refers to units which perform at least one function or operation and can be implemented by hardware components, software components or combinations thereof.

FIG. 1 is a drawing showing a configuration of a battery charging apparatus according to an exemplary embodiment.

The battery charging apparatus 1 will be described hereinafter with reference to FIG. 1.

Referring to FIG. 1, a battery 2 is connected to a charger 3 through a terminal unit 10, a battery pin BP, and a charger pin CP.

The battery 2 applies a terminal voltage through the terminal unit 10 based on the type of the battery 2.

The charger 3 includes a control unit or controller 300 and the terminal voltage is received by the control unit 300.

The control unit 300 may determine whether the battery 2 is connected to the charger 3 by measuring the voltage or current received at the control unit 300.

The control unit 300 determines the type of the battery 2 based on the received terminal voltage or terminal current and may control a charging voltage to meet the specifications of the battery 2 in accordance with the received terminal voltage or current.

The battery 2 may be charged with the charging voltage controlled by the charger 3 to meet the specifications of the battery 2.

The terminal voltage or current may be applied to the control unit 300 through the charger pin CP connected to the battery pin BP.

In some embodiments, if the battery 2 has a 1 A-20 V specification, the battery 2 can transfer a terminal voltage of about 2 V to the charger 3. In these embodiments, the about 2V terminal voltage indicates the specification of the battery 2. The control unit 300 reads the terminal voltage of about 2 V and then charges the battery 2 with 1 A-20 V charging voltage and current in accordance with the specification of the battery 2.

The charger 3 may generate the charging voltage or current by using an alternator or generator based on the type of the battery 2.

In this way, the battery 2 generates the terminal voltage based on the type of the battery pack 20.

The charger 3 determines the type of the battery based on the terminal voltage and charges the battery 2 with a charging voltage corresponding to the type of the battery 2.

Figure 2:
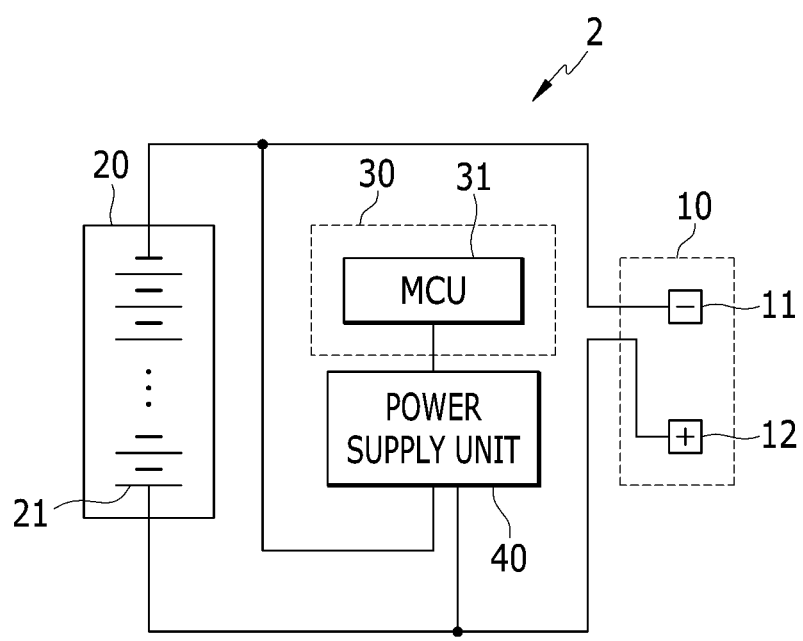
FIG. 2 is a drawing showing the structure of the battery of FIG. 1.

FIG. 2 is a drawing showing the structure of the battery 2 according to an exemplary embodiment.

The battery 2 will be described hereinafter with reference to FIG. 2.

Referring to FIG. 2, the battery 2 includes the terminal unit 10, the battery pack 20, a battery management system (BMS) 30, and a power supply unit or power supply 40.

The battery pack 20 may include one or more battery cells 21 and the battery cells 21 may be connected in series or in parallel.

The terminal unit 10 includes a positive electrode 11 and a negative electrode 12. The positive and negative electrodes 11 and 12 are respectively connected to positive and negative electrodes of the battery pack 20.

The voltage and current stored in the battery pack 20 are applied to the BMS 30 through the terminal unit 10.

The terminal voltage may be transferred through the negative and positive electrodes of the terminal unit 10 or may be transferred through an additional battery pin BP.

The power supply unit 40 is connected to the negative and positive electrodes 11 and 12 of the terminal unit 10 and a microcontroller unit (MCU) 31.

The power supply unit 40 supplies an operating voltage of the MCU 31 by using the power of the battery pack 20.

The power supply unit 40 applies the terminal voltage to the terminal unit 10 based on the control of the MCU 31.

The power supply unit 40 may transfer the voltage and current of the battery pack 20 to the MCU 31.

The BMS 30 is connected to the terminal unit 10, the battery pack 20, and the power supply unit 40, and may generate and supply the terminal voltage based on the specifications of the battery pack 20 to the terminal unit 10 or battery pin BP.

The BMS 30 may include the MCU 31.

The MCU 31 may determine whether the charger 3 is connected to the terminal unit by measuring a voltage or current of the charger 3 received at the terminal unit 10.

The MCU 31 may determine the type of the battery pack 20 and the battery cell 21 based on the voltage or current of the battery pack 20.

The MCU 31 may generate the terminal voltage corresponding to the type of the battery pack 20 or battery cell 21 in the power supply unit 40 by using the power of the battery pack 20 and may then control the power supply unit 40 to apply the generated terminal voltage to the terminal unit 10.

The MCU 31 may determine whether an abnormality has occurred in the battery pack 20 or battery cell 21 by measuring the voltage or current of the battery pack 20 or battery cell 21.

When the MCU 31 has determined that an abnormality has occurred in the battery pack 20 or battery cell 21, a protection operation may be executed including disconnecting the terminal unit 10 from the battery pack 20, so that the charging voltage of the charger 3 is not supplied to the battery pack 20.

Figure 3:
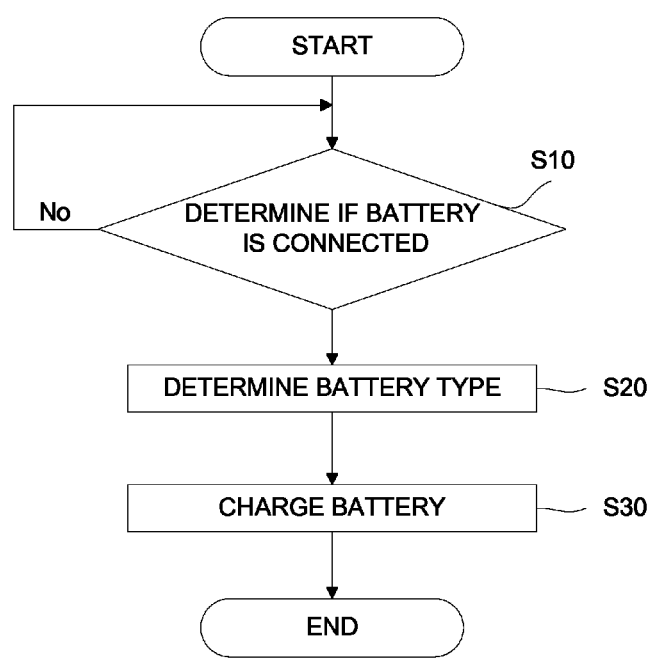
FIG. 3 is a flowchart showing a battery charging method according to an exemplary embodiment.

FIG. 3 is a flowchart showing a battery charging method according to an exemplary embodiment.

Referring to FIG. 3, a control unit 300 determines whether the charger 3 is connected to a battery 2 (S10). The control unit 300 determines whether a battery pack 20 is connected to the charger 3 by measuring a terminal voltage or current.

Next, the control unit 300 determines the type of the battery 2 (S20) connected to the charger 3. The charger 3 determines the type of the battery pack 20 or battery cell 21 by using the measured voltage or current of the battery pack 20.

Moreover, the control unit 300 determines the type of the battery pack 20 based on the voltage or current of at least one battery cell 21.

An MCU 31 controls the power supply unit 40 to generate a terminal voltage or current corresponding to the specification or type of the battery pack 20 or battery cell 21.

The MCU 31 determines whether an abnormality has occurred in the battery pack 20 by using the measured voltage or current of the battery pack 20.

The MCU 31 further determines whether an abnormality has occurred in the battery pack 20 by using the measured voltages or currents of the at least one battery cell 21.

Lastly, the charger charges the battery 2 (S30). The control unit 300 generates the charging voltage or current to charge the battery pack 20 based on the type of the battery 2.

While the described technology has been described in connection with what is presently considered to be practical exemplary embodiments, it is to be understood that the invention is not limited to the disclosed embodiments, but those skilled in the art may suggest other exemplary embodiments by adding, modifying, or removing components within the spirit and scope of the appended claims and the other exemplary embodiments fall into the scope of the described technology.

What is claimed is:

1. A battery charging apparatus, comprising:
   a battery including:
   a battery pack including at least one battery cell,
   a battery management system (BMS) configured to: i) determine a type of the battery pack based on a voltage or current of the battery pack, and ii) control the generation of a terminal voltage based at least in part on the type of the battery pack determined by the BMS, and
   a terminal unit including electrodes configured to receive the terminal voltage; and
   a charger including a controller configured to: i) determine the type of the battery pack based at least in part on the terminal voltage and ii) control the generation of a charging voltage corresponding to the type of the battery pack determined by the charger.

2. The apparatus of claim 1, wherein the electrodes are configured to receive the charging voltage.

3. The apparatus of claim 2, wherein the BMS is further configured to determine i) whether the battery is connected to the charger based at least in part on the voltage across the electrodes and ii) the type of battery based at least in part on the voltage received from the battery pack.

4. The apparatus of claim 1, wherein the BMS is further configured to i) measure a voltage across the battery cell and ii) determine the type of the battery pack based at least in part on the measured voltage.

5. The apparatus of claim 4, wherein the BMS is configured to detect whether an abnormality has occurred in the battery pack based at least in part on the measured voltage of the battery cell.

6. The apparatus of claim 1, wherein the BMS is further configured to i) measure a current of the battery cell and ii) determine the type of the battery pack based at least in part on the measured current.

7. The apparatus of claim 6, wherein the BMS is further configured to determine whether an abnormality has occurred in the battery pack based at least in part on the measured current of the battery cell.

8. The apparatus of claim 1, wherein the battery further includes a power supply and wherein the BMS includes a microcontroller unit (MCU) configured to i) measure a voltage or current of the terminal unit, ii) determine whether the charger is connected to the terminal unit based at least in part on the measured voltage or current of the terminal unit, iii) measure the voltage or current of the battery pack, iv) determine the type of the battery pack based at least in part on the measured voltage or current of the battery pack, and v) control the power supply to generate the terminal voltage.

9. The apparatus of claim 8, wherein the power supply is further configured to generate the terminal voltage and an operating voltage for the MCU using power from the battery pack.

10. The apparatus of claim 1, wherein the charger further includes an alternator or a generator and wherein the controller is further configured to control the alternator or generator to generate the charging voltage.

11. The apparatus of claim 1, wherein the battery further includes a battery pin and wherein the charger is configured to receive the terminal voltage through the battery pin.

12. A method for charging a battery in a battery charging apparatus including a charger and the battery, the battery comprising i) a battery pack including at least one battery cell, ii) a battery management system (BMS), and iii) a terminal unit, the method comprising:
   the BMS determining a type of the battery pack based on a voltage or current of the battery pack,
   the BMS applying a terminal voltage to the terminal unit based at least in part on the type of the battery pack determined by the BMS;
   the charger receiving the terminal voltage from the terminal unit;
   the charger determining the type of battery pack based at least in part on the terminal voltage; and
   the charger generating a charging voltage based at least in part on the type of battery pack determined by the charger.

13. The method of claim 12, further comprising:
   the charger measuring a voltage or current of the terminal unit; and
   the charger determining whether the battery pack is connected to the charger based at least in part on the measured voltage or current.

14. The method of claim 13, further comprising:
   the BMS measuring a voltage across the battery cell; and
   the BMS determining the type of the battery pack based at least in part on the measured voltage.

15. The method of claim 14, further comprising the BMS determining whether an abnormality has occurred in the battery pack based at least in part on the measured voltage.

16. The method of claim 13, further comprising:
the BMS measuring a current of the battery cell; and
the BMS determining the type of the battery pack based at least in part on the measured current.

17. The method of claim 16, further comprising the BMS determining whether an abnormality has occurred in the battery pack based at least in part on the measured current.

18. A battery charging apparatus, comprising:
a battery including:
a battery pack, and
a battery management system (BMS) configured to: i) determine a type of the battery pack based on a voltage or current of the battery pack, and ii) control the generation of a terminal voltage based at least in part on the type of the battery pack determined by the BMS,
a charger configured to: i) receive the terminal voltage from the battery, ii) determine the type of the battery pack based at least in part on the received terminal voltage, and iii) generate a charging voltage based on the type of the battery pack determined by the charger.

19. The battery charging apparatus of claim 18, wherein the battery further includes a pair of terminals configured to receive the terminal voltage and the charging voltage and wherein the BMS is further configured to determine i) whether the battery is connected to the charger based at least in part on the voltage across the terminals and ii) the type of battery based at least in part on a voltage received from the battery pack.

20. The battery charging apparatus of claim 18, wherein the battery further includes a power supply configured to generate the terminal voltage, wherein the BMS comprises a microcontroller unit (MCU) configured to i) measure the voltage or current of the battery pack, ii) determine the type of the battery pack based at least in part on the measured voltage or current of the battery pack, and iii) control the power supply to generate the terminal voltage.

* * * * *